Dec. 22, 1964  G. S. MASON  3,162,793
PLURAL MOTOR EXTERNALLY GEARED ELEVATOR DRIVE
WITH LOAD SHARING AND FRICTION BRAKING
Filed June 29, 1961  3 Sheets-Sheet 1

INVENTOR
GEORGE S. MASON

BY *Mason, Mason & Albright*
ATTORNEYS

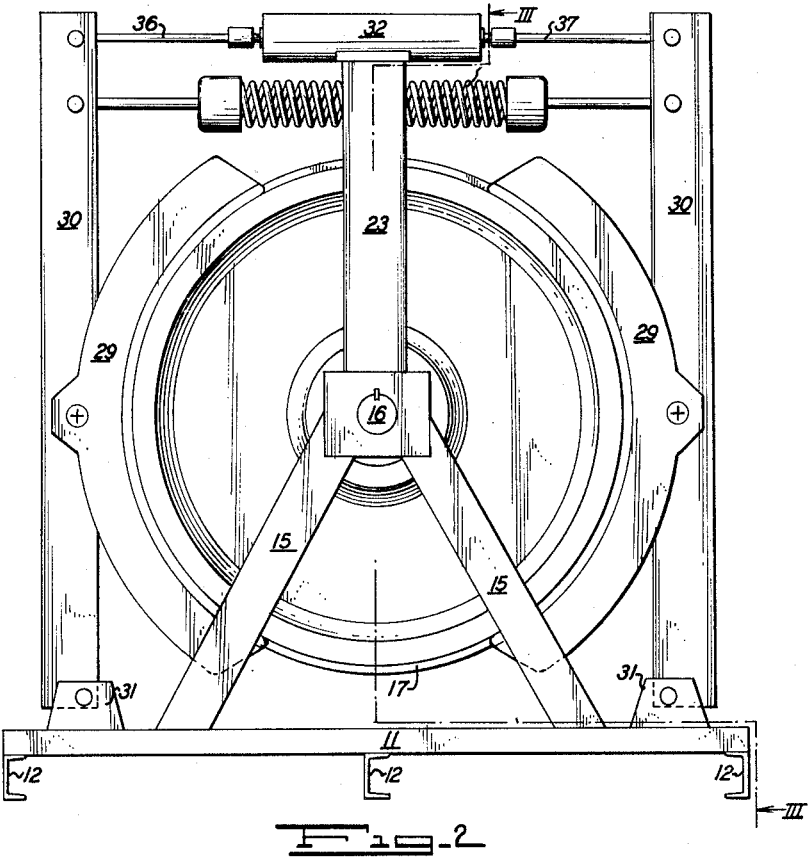
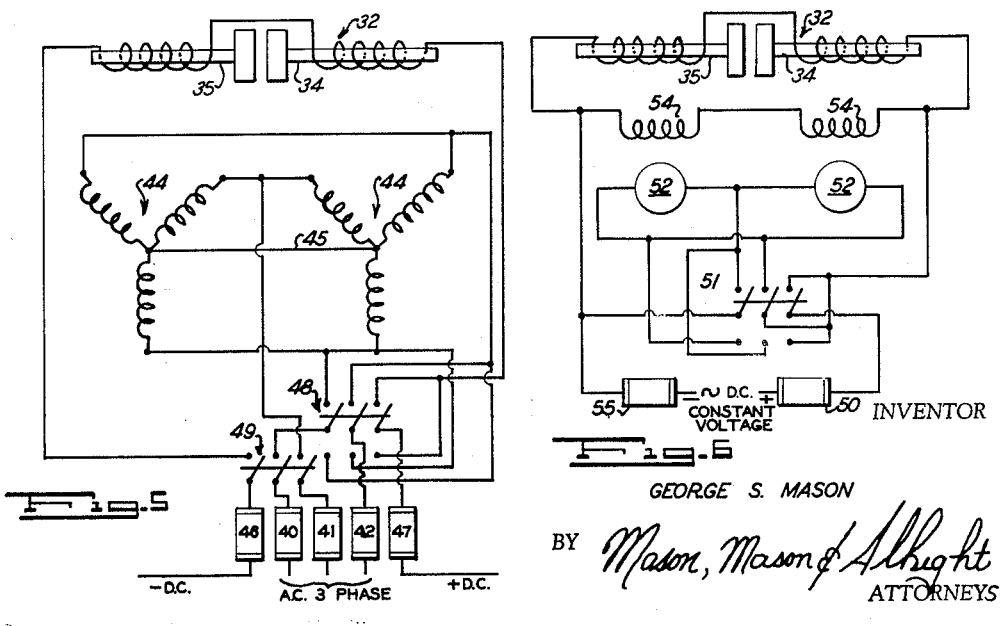
GEORGE S. MASON
BY Mason, Mason & Albright
ATTORNEYS

Dec. 22, 1964 G. S. MASON 3,162,793
PLURAL MOTOR EXTERNALLY GEARED ELEVATOR DRIVE
WITH LOAD SHARING AND FRICTION BRAKING
Filed June 29, 1961 3 Sheets-Sheet 3

INVENTOR
GEORGE S. MASON
BY Mason, Mason & Albright
ATTORNEYS

United States Patent Office 3,162,793
Patented Dec. 22, 1964

3,162,793
PLURAL MOTOR EXTERNALLY GEARED ELEVATOR DRIVE WITH LOAD SHARING AND FRICTION BRAKING
George S. Mason, S. Main St. Ext., R.R. 2, Jamestown, N.Y.
Filed June 29, 1961, Ser. No. 120,618
7 Claims. (Cl. 318—8)

This invention relates to an elevator machine and more particularly to a machine of this type which is externally geared and which provides a braking means when the electrical current to the drive motors is interrupted.

Current types of elevator machines generally have oil submerged gearing in closed casings, which require periodic checking and changing of the oil.

It is an object of this invention to provide a machine which employs an external gearing arrangement which permits the elimination of the gear casing and also permits the convenient utilization of a plurality of motors.

A further object is to provide an improved, effective, elevator machine wherein thrust bearings, worms and wormgears have been eliminated and the design permits a lower center of gravity of the machine.

An additional object is to provide an elevator machine which permits the utilization of electric motors of lower horsepower and manufacturing costs.

Another object is to provide a gear arrangement for the elevator machine wherein the working load is distributed over a large gear tooth area.

Moreover, the design of the invention permits the reduction of manufacturing costs by the use of commercial material and a reduction in the amount of materials used in the construction of the machine in contrast with comparable machines of the prior art.

Figure 1:
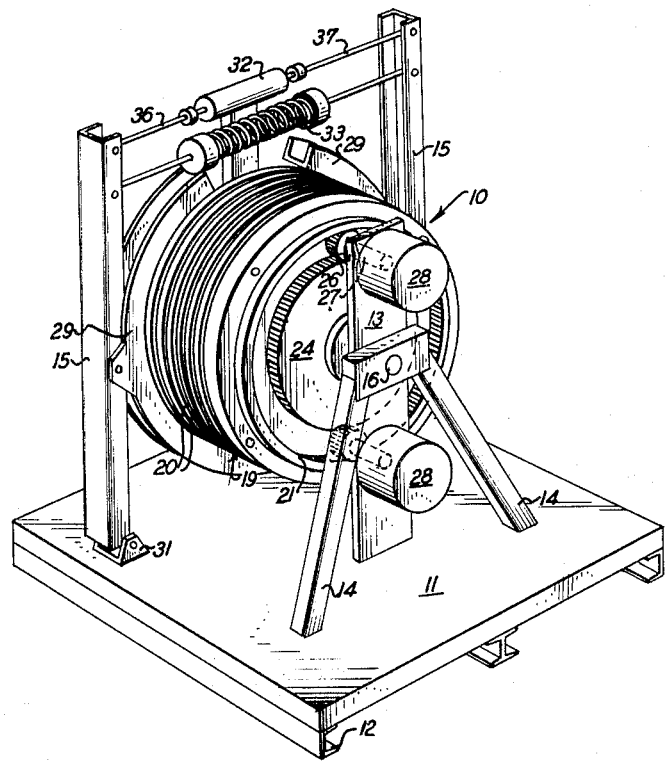
Figure 4:
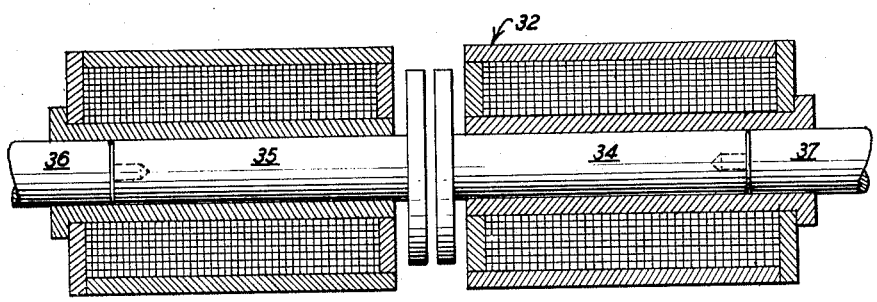
Figure 3:
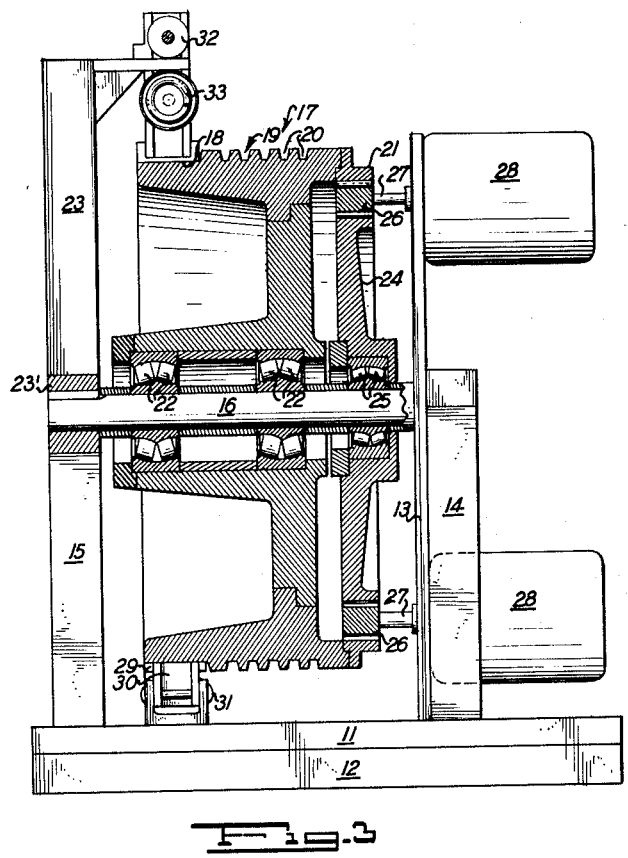
Figure 7:
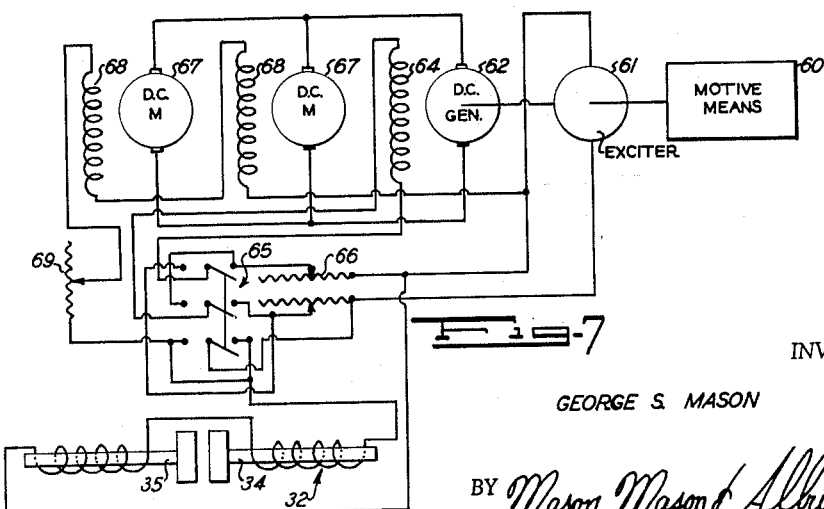

Other objects, adaptabilities, and capabilities will appear as the description progresses, reference being had to the accompanying drawings in which FIGURE 1 is a perspective view of the invention;
FIGURE 2 is a back elevational view;
FIGURE 3 is a section view on lines II—II of FIGURE 2;
FIGURE 4 is a sectional view of the brake magnet;
FIGURE 5 is a diagram of the wiring for squirrel cage type motors;
FIGURE 6 is a wiring diagram of the motors connected to a constant voltage direct current circuit; and
FIGURE 7 is a wiring diagram showing a generator field control for the motors.

It will be understood that although the machine of this invention is designed for elevators of both the passenger and freight types, the invention is not restricted to this use alone.

The elevator machine designated generally as 10 in the drawings is provided with a base plate 11 which is mounted on transverse beams 12 as required. Secured to base 11 are two frame parts 14 and 15 which support a static shaft axle 16 at either end parallel to the base 11. Mounted between the frames 14 and 15 on static axle 16 is the reel unit 17, which comprises a brake pulley portion 18, a traction drive 19 which is provided with cable grooves 20 and a ring gear 21. Brake pulley portion 18, traction drive 19 and ring gear 21 are secured together by suitable means such as welding or bolts. The bearings 22 which mount reel unit 17 are of the seal type which are self-lubricated. The reel unit 17 may be integral and of cast material for economy purposes.

Also mounted adjacent the reel unit 17 on the static shaft axle 16 and within the plane of the ring gear 21 is an auxiliary gear 24 which is also provided with a bearing 25 of the seal type which requires no further lubrication. Two drive gears 26 are interposed between the auxiliary gear 24 and ring gear 21. Drive gears 26 are rotated by their respective motor shafts 27 which are connected to motors 28. Motors 28 are mounted on a motor mounting 13 secured to frame parts 14.

Embracing the after end of the reel unit 17 and spaced about the brake pulley portion 18 is a braking apparatus which includes lined brake shoes 29. These brake shoes 29 are held proximate to the brake pulley portion 18 by means of levers 30, which are pivoted on their lower ends by connections 31 to the base plate 11. At the upper extremity of the levers 30 there is interposed an extension spring 33 which tends to pull levers 30 together and bring the brake shoes 29 into contact with the brake pulley portion 18. A stanchion 23 extending upwardly from the juncture of frame parts 15 carries a brake magnetic coil 32. Coil 32 is so wound that when a direct current is provided to the coil, magnetic flux is produced whereby the two magnetic cores 34 and 35 are electro-magnets which repulse each other and force apart the connecting shafts 36 and 37 which, in turn, are connected to levers 30. By this means, the levers 30 together with shoes 29 are held apart from the brake pulley portion 18. But when the current in coil 32 is interrupted, cores 34 and 35 are no longer repulsed and permit shafts 36 and 37 to move closer together due to the action of spring 33 which causes brake shoes 29 to grasp the brake pulley portion 18.

Referring now to the wiring diagrams, it is to be seen from FIGURE 5 that three-phase alternating current from lines 40, 41 and 42 is interconnected with the field windings 44 of the respective motors 28, which, for the purposes of this figure, are squirrel cage motors. Only one set of field windings is shown for each motor in this diagram. However, it is to be appreciated that the motor may incorporate both high speed and slow speed windings. A compounding connection 45 is provided to equalize the load on each motor. Direct current lines 46 and 47 which may be provided from a rectifier (not shown) or other suitable direct current source, are connected to the magnetic coil 32. A two-way three-blade switch 48 is provided for reversing the direction of the motors 28 and a single throw three-blade switch 49 is provided as a main line switch.

It is to be seen that when switch 49 is closed and switch 48 is closed in the up position, direct current is provided to coil 32 to maintain levers 30 and brake shoes 29 apart from the brake pulley portion 18, and motors 28 are energized causing drive gears 26 to turn ring gear 21 together with the reel unit 17 in one direction and auxiliary gear 24 in the other. When it is desired to stop the rotation of ring gear 21, together with the reel unit 17, switch 48 is disengaged whereby current ceases to flow to the motor fields 44 and also to coil 32. Hence in coil 32, magnet cores 34 and 35 will no longer be repulsed and the shafts 36 and 37 will permit spring 33 to draw levers 30 together and brake shoes 29 to grasp the brake pulley portion 18 to brake the rotation of the reel unit 17. When switch 48 is placed in a down position, coil 32 is again energized and cores 34 and 35 are repulsed to release brake shoes 29 from the brake pulley portion 18, thereby releasing the reel unit 17 and permitting motors 28 (with two of the field winding phases reversed) to rotate ring gear 21, together with reel unit 17, in a direction opposite of that before. It is thus to be understood that the reel unit 17 can be rotated in one direction or the other direction by means of switch 48 and is stopped by brake shoes 29 and brake pulley portion 18 when the drive motors 28 are not energized.

FIGURE 6 shows alternative circuit where there is a supply of direct current having a constant voltage. Current is provided from a positive line 50 through a two-way three-blade switch 51 to armatures 52 of motors 28 (which in this illustration are direct current motors), to motor fields 54, and to coil 32, as before. Current is returned through the negative electrical outlet line 55. In operation, when the switch 51 is in up position, direct current is provided to armatures 52 and fields 54 to permit motors 28 to rotate in the appropriate direction. As before, magnetic cores 35 and 34 are repulsed in coil 32 to hold the brake shoes 29 away from the brake pulley portion 18. However, when switch 51 is opened, as shown in the diagram in FIGURE 6, the power to the motors 28 is shut off as well as the electric current to the coil 32, thus permitting spring 33 to bring the brake shoes 29 into contact with the brake pulley portion 18 to stop reel unit 17 from further rotation. When switch 51 is placed in down position, the direct current to the armatures 52 is reversed, thereby causing the armatures to revolve in the opposite directions, which in turn causes the reel unit 17 to revolve in an opposite direction from before. Coil 32 is then energized to bring the brake shoes 29 away from the brake pulley portion 18. Permanent magnets may be substituted to produce fields 54.

From the foregoing, it will be understood that switch 51 controls the direction of rotation of the reel unit 17 and permits the reel unit to be held by the brake shoes 29 against the brake pulley portion 18 when the motors are not energized.

FIGURE 7 shows a generator field control system. In such a system a motive means 60, which may be an electric motor or other type of motor, turns an exciter 61 and a direct current generator 62. The motors 28 in this figure are again direct current motors. The D.C. generator 62 is separately excited from the exciter 61 by means of a field 64. It will be appreciated from the diagram that the field 64 is, through a two-way three-blade switch 65, connected into a variable rheostat 66 whereby the strength of generator field 64 created by the exciter 61 may be varied from practically zero to the full voltage and may be reversed by switch 65. Armatures 67 of motors 28 are connected in parallel to the D.C. generator 62. It will therefore be appreciated that when the field 64 of D.C. generator 62 is reversed, the fields of the armature windings of armatures 67 will also be reversed. Fields 68 for motors 28, however, are not reversed. The rheostat 69 through which the constant voltage exciter current is fed to motor fields 68 in series may be preset in order to regulate for the most effective speed of motors 28. Coil 32 is also energized from the direct current taken from exciter 61. It is thus to be appreciated from FIGURE 7 that when the switch 65 is in the up (right) position, motors 28 revolve in the desired direction and current is supplied to coil 32 to hold the brake shoes 29 away from the brake pulley portion 18. However, when switch 65 is disengaged, the current to the motors 28 is cut off as well as that to the coil 32. Thus the motors will stop and the reel unit 17 will also be stopped by the action of brake shoes 29 against the brake pulley portion 18. When the switch 65 is placed in its down (left) position the field 64 is reversed, thus reversing the current from D.C. generator 62 to armatures 67 and motors 28 consequently revolve in a direction opposite to that before. Accordingly, reel unit 17 also revolves in an opposite direction, brake shoes 29 being disengaged from brake pulley portion 18 due to the repulsion of the magnetic cores 34 and 35 within the now energized coil 32. The speed of the reel 17 is governed by the setting of rheostat 66, or the use of additional magnetic fields which any specific machine use may require.

From the foregoing description, it is to be appreciated that in each of the electrical embodiments, the motors 28 will divide the power requirements between them in an equal manner for revolving the reel unit 17. While two motors only have been shown in each instance, it is to be appreciated, that a number of motors may be employed with corresponding drive gears around the ring gear to share the load. Moreover, it will also be understood by those skilled in the art that the motors 28 may be so wired that a portion of them may be allowed to idle when desired. Thus a great variety of power requirements for the elevator is possible through this arrangement. Moreover, should a motor burn out, the elevator will remain operable by means of the remaining motor or motors until a replacement or repairs can be provided.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. An elevator machine which comprises a framework, an axle mounted substantially horizontally on said framework, a reel unit rotatably carried by said axle, a ring gear circumscribing said axle included in said reel unit, a plurality of reversible electric drive motors including drive shafts mounted on said framework, a source of electric power to said motors, compounding connection means for equally loading said motors, a drive gear directly connected to the drive shafts of each of said motors meshing with said ring gear, a brake pulley portion of said reel unit, a pair of brake shoes proximate to said brake pulley portion, a source of direct current, a pair of coils longitudinally relative to each other and carrying said direct current, opposing cores embraced by each of said coils which repulse each other when direct current flows through said coils, means interconnecting said cores and said brake shoes to hold said brake shoes from said brake pulley portion when said cores are repulsing each other, resilient means interconnecting said brake shoes and urging same into contact with said brake pulley portion, and switch means for interruption of said direct current and said electric power for reversing said electric motors whereby when said switch is disengaged said motors are de-energized and said brake shoes contact said brake pulley portion which acts to brake said reel unit.

2. A structure as claimed in claim 1 wherein said power source is a three-phase alternating current and said motors are squirrel cage type motors with compounding connections between their field windings to equalize their power load.

3. A structure as claimed in claim 1 wherein said power source is a constant voltage direct current and wherein said motors are direct current motors with compounding connections between the armatures of said motors to equalize their power load.

4. A structure as claimed in claim 1 wherein said power source constitutes a direct current generator, and having an exciter and motive means driving said exciter and said generator, the fields of said motors responsive to said exciter and said generator.

5. A structure as claimed in claim 1 which includes a rheostat interposed between said power source and said motors whereby the power to said motors may be varied.

6. An elevator machine which comprises a framework, an axle mounted substantially horizontally on said framework, a reel unit rotatably carried by said axle, a ring gear circumscribing said axle included in said reel unit, a plurality of reversible electric drive motors, a source of electric power to said motors, compounding connection means for equally loading said motors, a drive gear from each of said drive motors and having a direct mechanical connection therewith meshing with said ring gear, a braking apparatus for said reel unit, a pair of electromagnets interconnected to said braking apparatus, direct current energizing said electro-magnets to disengage said braking apparatus from said reel unit, and switch means for said direct current and said motors whereby when said switch means is opened said motors are de-energized and said braking apparatus engages said reel unit and when said switch means is closed said braking apparatus disengages said reel unit and said motors are energized.

7. An elevator machine which comprises a framework including a pair of stanchions, an axle mounted substantially horizontally between the stanchions of said framework, a reel unit rotatably carried on said axle, an internally toothed ring gear circumscribing said axle and included in said reel unit, a pair of reversible electric drive motors including drive shafts, a source of electric power to said motors, compounding connection means for equally loading said motors a drive gear directly connected to the drive shafts of each of said motors meshing with said ring gear, an auxiliary gear carried by said axle also meshing with said drive gears, opposite said ring gear, a brake pulley portion included in said reel unit, a pair of brake shoes proximate to said brake pulley portion, levers pivotally connected to said framework mounting said brake shoes, a source of direct current, a pair of coils having coincident axes interconnected to said direct current, opposing cores embraced by said coils which repulse each other when direct current flows through said coils, said cores acting against said levers to hold brake shoes from said brake pulley portion when said cores repulse each other, resilient means connecting said levers and urging said brake shoes into contact with said brake pulley portion, and switch means for interruption of said direct current and said electric power for reversing said motors whereby when said switch is disengaged said motors are deenergized and said brake shoes are in contact with said brake pulley portion and when said switch is engaged said brake shoes are disengaged from said brake pulley portion and said motors are energized and rotated by said power source.

References Cited by the Examiner

UNITED STATES PATENTS

| | | | |
|---|---|---|---|
| 771,351 | 10/04 | Clark | 187—29 |
| 828,983 | 8/06 | Sundh | 318—371 |
| 924,799 | 6/09 | Lamme | 318—99 X |
| 987,673 | 3/11 | Dunn | 318—372 X |
| 1,002,233 | 9/11 | Dickinson | 318—370 |
| 1,014,216 | 1/12 | Gale | 318—372 |
| 1,047,255 | 12/12 | Lindquist | 318—372 |
| 1,414,422 | 5/22 | Lammers | 318—86 X |
| 1,911,389 | 5/33 | Pratt | 318—8 |
| 2,429,570 | 10/47 | Trofimov | 318—8 |
| 2,648,502 | 8/53 | Trofimov | 318—8 X |
| 2,666,876 | 1/54 | Sinclair | 318—8 |

FOREIGN PATENTS

| | | |
|---|---|---|
| 819,397 | 9/59 | Great Britain. |
| 962,997 | 5/57 | Germany. |

ORIS L. RADER, *Primary Examiner.*